US012668234B2

(12) United States Patent
Tachiiri et al.

(10) Patent No.: US 12,668,234 B2
(45) Date of Patent: Jun. 30, 2026

(54) VEHICLE TRAVEL CONTROL DEVICE

(71) Applicant: DENSO CORPORATION, Kariya-city (JP)

(72) Inventors: Motoki Tachiiri, Nisshin-city (JP); Yuta Suzuki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 71 days.

(21) Appl. No.: 18/659,903

(22) Filed: May 9, 2024

(65) Prior Publication Data

US 2024/0286602 A1　　Aug. 29, 2024

Related U.S. Application Data

(63) Continuation of application No. PCT/JP2022/041492, filed on Nov. 8, 2022.

(30) Foreign Application Priority Data

Nov. 12, 2021　　(JP) ................................. 2021-185158

(51) Int. Cl.
*B60W 30/06* (2006.01)
*B60W 30/095* (2012.01)
*B60W 50/14* (2020.01)

(52) U.S. Cl.
CPC ........ *B60W 30/06* (2013.01); *B60W 30/0956* (2013.01); *B60W 50/14* (2013.01);
(Continued)

(58) Field of Classification Search
CPC .... B60W 10/08; B60W 10/06; B60W 10/184; B60W 10/18; B60W 20/00; B60W 2520/10; B60W 2540/10; B60W 10/04; B60W 2710/083; B60W 30/18127; B60W 10/20; B60W 2540/12; B60W 10/10;
(Continued)

(56) References Cited

U.S. PATENT DOCUMENTS 6,341,827 B1 * 1/2002 Fennel ................... B60T 8/268
303/113.5
6,481,524 B1 * 11/2002 Ishida ................... B62D 15/02
180/252
(Continued)

FOREIGN PATENT DOCUMENTS

JP　　　2007237862 A　　9/2007
JP　　　2010288449 A　　12/2010
(Continued)

*Primary Examiner* — Daniel Previl
(74) *Attorney, Agent, or Firm* — Precision Patents, P.C.

(57) ABSTRACT
A vehicle travel control device controls an independent turn wheel vehicle or a swivel three-wheeled vehicle having three or more wheels. The device instructs a turn with a normal driving operation, instructs a pivot turn for setting one wheel as a turning center and driving other wheels using a target instruction value, turns each wheel individually according to the turning center of the pivot turn, and brakes and drives each wheel individually. Further, the device acquires vehicle characteristics from a vehicle characteristic storage device, and calculate a turn wheel angle and a drive direction of each wheel based on the target instruction value to execute the pivot turn of the vehicle.

6 Claims, 16 Drawing Sheets

(52) U.S. Cl.
  CPC . *B60W 2050/143* (2013.01); *B60W 2050/146*
      (2013.01); *B60W 2420/54* (2013.01); *B60W*
                              *2520/14* (2013.01)

(58) Field of Classification Search
  CPC ......... B60W 2520/14; B60W 2540/18; B60W
      2510/244; B60W 10/02; B60W 2552/15;
      B60W 10/26; B60W 2720/14; B60W
      30/02; B60W 2520/28; B60W 30/045;
      B60W 2710/18; B60W 2520/105; B60W
      2520/125; B60W 20/15; B60W 20/40;
      B60W 20/10; B60W 2556/50; B60W
      30/20; B60W 2554/00; B60W 2710/0666;
      B60W 50/029; B60W 10/22; B60W
      2710/0644; B60W 2710/182; B60W
      30/18109; B60W 2720/106; B60W 30/09;
      B60W 10/188; B60W 2510/18; B60W
      10/115; B60W 2510/081; B60W 2520/26;
      B60W 40/10; B60W 2050/146; B60W
      2510/1005; B60W 30/14; B60W 30/182;
      B60W 50/0205; B60W 20/13; B60W
      20/20; B60W 2030/206; B60W 2520/30;
      B60W 2552/20; B60W 30/18172; B60W
      40/08; B60W 50/082; B60W 50/14;
      B60W 20/16; B60W 2050/0031; B60W
      2520/20; B60W 30/18145; B60W 40/114;
      B60W 10/11; B60W 2510/0638; B60W
      2510/20; B60W 2510/246; B60W
      2554/80; B60W 2720/30; B60W
      2720/403; B60W 30/0956; B60W 30/12;
      B60W 50/0097; B60W 50/0098; B60W
      50/02; B60W 20/14; B60W 2510/202;
      B60W 2530/20; B60W 2540/16; B60W
      2710/08; B60W 30/00; B60W 30/025;
      B60W 30/06; B60W 40/103; B60W
      50/0225; B60W 50/16; B60W 10/119;
      B60W 20/11; B60W 20/30; B60W
      2030/18081; B60W 2050/0006; B60W
      2050/143; B60W 2520/16; B60W
      2530/10; B60W 2540/215; B60W
      2540/229; B60W 2552/40; B60W
      2556/00; B60W 2720/10; B60W 2720/16;
      B60W 20/12; B60W 2420/403; B60W
      2552/53; B60W 2555/60; B60W
      2710/081; B60W 2710/20; B60W
      2710/207; B60W 2720/18; B60W 30/143;
      B60W 30/18118; B60W 30/18136; B60W
      40/064; B60W 40/105; B60W 50/04;
      B60W 60/001; B60W 10/113; B60W
      10/192; B60W 2050/0295; B60W
      2300/36; B60W 2510/0657; B60W
      2510/068; B60W 2520/06; B60W
      2710/0627; B60W 2710/226; B60W
      2710/246; B60W 2720/125; B60W
      30/165; B60W 30/19; B60W 40/09;
      B60W 40/109; B60W 40/13; B60W
      50/00; B60W 10/16; B60W 2040/0818;
      B60W 2050/009; B60W 2050/0091;
      B60W 2050/0094; B60W 2050/0297;
      B60W 2510/08; B60W 2510/186; B60W
      2552/35; B60W 2554/4041; B60W 30/16;
      B60W 30/18; B60W 30/192; B60W
      50/035; B60W 50/038; B60W 50/045;
      B60W 10/14; B60W 10/182; B60W
      10/24; B60W 10/28; B60W 10/30; B60W
      20/50; B60W 2030/1809; B60W
      2040/1315; B60W 2050/0035; B60W
      2050/0037; B60W 2420/408; B60W
      2510/0208; B60W 2510/182; B60W
      2420/54; B60W 2540/223; B60W
      30/18163; B60W 2540/221; B60W
      2540/225; B60W 50/10; B60W 60/0059;
      B60W 2300/152; B60W 50/08; B60W
      60/0053; B60W 20/19; B60W 2300/362;
      B60W 2540/21; B60W 2540/227; B60W
      2552/30; B60W 2554/801; B60W
      30/18027; B60W 60/0015; B60W
      60/0051; B60W 60/0055; B60W
      2050/007; B60W 2050/0073; B60W
      2050/0083; B60W 2510/0241; B60W
      2510/025; B60W 2510/0652; B60W
      2510/1015; B60W 2510/102; B60W
      2540/00; B60W 2540/01; B60W
      2540/106; B60W 2540/26; B60W
      2540/30; B60W 2552/50; B60W 2554/20;
      B60W 2554/60; B60W 2555/20; B60W
      2710/021; B60W 2710/022; B60W
      2710/0661; B60W 2710/1005; B60W
      2710/1011; B60W 2710/1016; B60W
      30/08; B60W 30/095; B60W 30/0953;
      B60W 30/10; B60W 30/18009; B60W
      30/18072; B60W 30/181; B60W 40/02;
      B60W 40/04; B60W 2530/12; B60W
      2530/16; B60W 2530/207; B60W
      2554/4042; B60W 2554/4043; B60W
      2556/10; B60W 2556/45; B60W 2556/65;
      B60W 2710/023; B60W 2710/06; B60W
      2710/0622; B60W 2710/0677; B60W
      2710/105; B60W 2710/223; B60W
      2710/244; B60W 2710/248; B60W 30/04;
      B60W 30/18054; B60W 30/188; B60W
      30/1882; B60W 40/068; B60W 40/076;
      B60W 2050/0071; B60W 2050/0292;
      B60W 2300/125; B60W 2510/085; B60W
      2554/402; B60W 2554/4044; B60W
      2554/4046; B60W 2554/802; B60W
      2710/086; B60W 2710/242; B60W
      2720/20; B60W 2720/28; B60W
      30/18063; B60W 40/06; B60W 40/072;
      B60W 40/12; B60W 60/0011; B60W
      60/005; B60W 10/12; B60W 10/196;
      B60W 20/17; B60W 2030/043; B60W
      2030/203; B60W 2040/0827; B60W
      2040/0872; B60W 2050/0008; B60W
      2050/001; B60W 2050/0011; B60W
      2050/0013; B60W 2050/0014; B60W
      2050/0022; B60W 2050/0024; B60W
      2050/0042; B60W 2050/0052; B60W
      2050/0054; B60W 2050/0063; B60W
      2050/0087; B60W 2050/0088; B60W
      2050/021; B60W 2510/0216; B60W
      2510/0275; B60W 2510/0614; B60W
      2510/069; B60W 2510/0695; B60W
      2510/10; B60W 2510/1055; B60W
      2510/107; B60W 2510/109; B60W
      2510/184; B60W 2510/207; B60W
      2510/242; B60W 2510/30; B60W
      2520/12; B60W 2520/18; B60W
      2520/263; B60W 2520/403; B60W
      2540/06; B60W 2540/14; B60W 2552/00;

B60W 2552/05; B60W 2555/00; B60W 2556/35; B60W 2556/40; B60W 2710/027; B60W 2710/065; B60W 2710/0694; B60W 2710/085; B60W 2710/10; B60W 2710/24; B60W 30/085; B60W 30/146; B60W 30/18036; B60W 30/1843; B60W 30/1886; B60W 40/101; B60W 40/107; B60W 40/11; B60W 40/112; B60W 50/032; B60W 60/0013; B60W 60/0025; B60W 60/0057; B60W 2050/0002; B60W 2050/002; B60W 2050/0028; B60W 2050/0036; B60W 2050/0057; B60W 2050/0072; B60W 2050/0075; B60W 2050/022; B60W 2510/06; B60W 2510/0676; B60W 2510/083; B60W 2520/04; B60W 2520/40; B60W 2540/103; B60W 2554/40; B60W 2554/804; B60W 2710/0605; B60W 2710/1022; B60W 2710/1033; B60W 2710/202; B60W 2720/26; B60W 2720/40; B60W 2720/406; B60W 2756/10; B60W 30/18045; B60W 30/1819; B60W 30/184; B60W 30/1846; B60W 60/0016; B60W 60/0027; B60W 60/007; B60W 50/12; B60W 2510/0619; B60W 2540/043; B60W 2540/049; B60W 2554/404; B60W 2720/24; B60W 50/023; B60W 50/087; B60W 60/00; B62K 5/027; B62K 5/10; B62K 23/06; B62K 5/05; B62K 27/12; B62K 5/02; B62K 11/007; B62K 2005/001; B62K 25/00; B62K 3/005; B62K 5/025; B62K 5/08; G06F 11/0796; G06F 11/181; G06F 11/1633; G06F 11/1637; G06F 11/1654; G06F 11/182; G06F 11/2007; G06F 3/01; G06F 11/183; G06F 30/20; G06F 9/3861; G06F 9/3867; B60R 16/0231; B60R 16/023; B60R 16/0232; B60R 2325/205; B60R 2325/304; B60R 25/02; B60R 25/042; B60R 25/08; B60R 25/102; B60R 25/33; B60R 1/00; B60R 1/06; B60R 1/12; B60R 1/24; B60R 1/26; B60R 1/27; B60R 11/04; B60R 16/0315; B60R 16/033; B60R 16/08; B60R 2001/1215; B60R 2300/302; B60R 2300/607; B60R 2300/70; B60R 2300/804; B60R 21/013; Y02A 50/20; G05D 2109/10; G05D 1/0088; G05D 1/0027; G05D 1/0038; G05D 1/0044; G05D 2107/13; G05D 1/2279; G05D 1/617; G05D 1/6987; G05D 1/0016; G05D 1/0022; G05D 1/2247; G05D 1/249; G05D 2105/22; G05D 1/0061; G05D 1/02; G05D 1/0255; G05D 1/247; G05D 1/00; G05D 1/2246; G05D 1/227; G05D 1/242; G05D 1/2435; G05D 1/245; G05D 1/2464; G05D 1/622; G05D 1/644; G05D 1/6485; G05D 1/661; G05D 2105/10; G05D 2105/87; G05D 2111/17; G05D 2111/54; G05D 1/0212; G05D 1/0219; G05D 1/0231; G05D 1/0248; G05D 1/0276; G05D 1/0278; G05D 1/0282; G05D 1/0287; G05D 1/0293; G05D 1/223; G05D 1/648; G05D 1/81; G05D 2105/15; G05D 2105/20; G05D 2107/21; G05D 1/0214; G05D 1/637; G05D 1/80; G05D 2105/28; G05D 2107/70; G08G 1/16; G08G 1/00; G08G 1/167; G08G 1/09; G08G 1/0962; G08G 1/096775; G08G 1/0969; G08G 1/166; G08G 1/0968; B62D 15/025; B62D 49/06; B62D 6/00; B62D 33/0617; B62D 5/046; B62D 6/008; B62D 1/286; B62D 15/0255; B62D 1/18; B62D 1/181; B62D 1/183; B62D 1/185; B62D 1/197; B62D 11/04; B62D 13/06; B62D 15/0285; B62D 25/06; B62D 25/07; B62D 49/00; B62D 5/001; B62D 5/006; B62D 5/008; B62D 5/0457; B62D 5/0463; B62D 5/0472; B62D 5/0478; B62D 5/0484; B62D 5/049; B62D 5/0493; B62D 5/06; B62D 5/062; B62D 5/08; B62D 5/09; B62D 6/002; B62D 6/003; B62D 6/007; B62D 6/10; B62D 15/02; B62D 15/029; B62D 5/04; B62D 53/005; B62D 6/04; B62D 65/18; B62D 7/148; B62D 7/1509; B62D 9/00; A01B 69/008; A01B 69/001; B60K 35/10; B60K 35/28; B60K 35/29; B60K 35/81; B60K 17/02; B60K 35/23; B60K 17/342; B60K 17/354; B60K 2001/001; B60K 2001/0438; B60K 2025/024; B60K 23/08; B60K 2360/166; B60K 2360/1868; B60K 26/02; B60K 28/10; B60K 35/22; B60K 35/235; B60K 35/654; B60K 35/85; B60K 6/24; B60K 6/26; B60K 6/38; B60K 6/387; B60K 6/448; B60K 6/4885; B60K 6/52; B60K 6/543; B60K 6/547; B60K 17/08; B60K 2360/175; B60K 2360/21; B60K 2360/334; B60K 2360/589; B60K 2360/592; B60K 35/233; B60K 35/60; B60K 35/65; B60K 35/652; B60K 37/00; B60K 7/0007; B60K 2310/244; B60K 2360/162; B60K 2360/176; B60K 2360/177; B60K 2360/782; B60K 2360/785; B60K 28/06; B60K 35/50; B60K 6/442; G01S 17/42; G01S 17/87; G01S 17/931; G01S 15/87; G01S 15/931; G01S 7/481; G01S 7/4813; G01S 7/52004; G01S 7/521; G01S 17/89; G01S 7/4804; G01S 19/13; A01D 41/1278; A01D 34/008; G02B 2027/014; G02B 2027/0141; G02B 27/0101; G02B 2027/0187; G02B 27/01; G02B 2027/0138; G09G 2340/12; G09G 2380/10; G09G 3/002; G09G 2310/08; G09G 2340/0464; G09G 3/001; G09G 5/003; G09G 5/377; Y02T 10/62; Y02T 10/60; Y02T 10/64; Y02T 10/72; Y02T 10/70; Y02T 10/7072; Y02T 90/14

USPC ....... 340/932.2, 935, 938, 951, 978, 426.31, 340/438, 465, 539.22, 475, 576

See application file for complete search history.

(56)                References Cited

U.S. PATENT DOCUMENTS

2002/0002435  A1*  1/2002  Ohtsu ..................... B60T 8/173
                                                        701/80
2004/0030479  A1*  2/2004  Arndt .................. B60T 8/17551
                                                        701/41

(56) References Cited

U.S. PATENT DOCUMENTS

| | | | | |
|---|---|---|---|---|
| 2005/0278107 A1* | 12/2005 | Disser | B60T 17/043 | |
| | | | | 701/76 |
| 2006/0015236 A1* | 1/2006 | Yamaguchi | B60K 17/358 | |
| | | | | 180/242 |
| 2012/0215392 A1* | 8/2012 | Hashimoto | B60W 20/00 | |
| | | | | 180/65.265 |
| 2013/0142385 A1* | 6/2013 | Mathieu | G02B 27/01 | |
| | | | | 345/473 |
| 2015/0006049 A1* | 1/2015 | Watanabe | B60W 50/038 | |
| | | | | 701/67 |
| 2015/0336607 A1* | 11/2015 | Inoue | B60W 30/10 | |
| | | | | 701/41 |

FOREIGN PATENT DOCUMENTS

| | | | |
|---|---|---|---|
| JP | 2016055714 A | 4/2016 | |
| JP | 2023131083 A | 9/2023 | |

* cited by examiner

TURN AT NORMAL TRAVEL

92

GRAVITY CENT

91

TURN CENT

93

94

100

PIVOT TURN

PIVOT TURN CENT = FR LEFT WHEEL    ← TURN DIR →    PIVOT TURN CENT = FR RIGHT WHEEL 91    92      91    92

93      94

94      93

100      100

TURN AT NORMAL TRAVEL

IN CASE OF "X1 < 1"

$$Rt = \sqrt{x1^2 + y1^2}$$

$$\tan \delta_{FL} = \frac{Lf - y1}{|x1| - \frac{Df}{2}} \qquad \tan \delta_{FR} = \frac{Lf - y1}{|x1| + \frac{Df}{2}}$$

$$\tan \delta_{RL} = -\frac{Lr + y1}{|x1| - \frac{Dr}{2}} \qquad \tan \delta_{RR} = -\frac{Lr + y1}{|x1| + \frac{Dr}{2}}$$

DIFFICULTY AT FOR PARA PARK

COMP EX

SPIN TURN 91
92
GRAVITY CENT = TURN CENT
93
94
100

PIVOT TURN CENT        92
100
60        94
91        100
93

$$\Delta \theta y = \theta y^* - \theta yo$$

PIVOT TURN CENT

VEHICLE TRAVEL CONTROL DEVICE

CROSS REFERENCE TO RELATED APPLICATION

The present application is a continuation application of International Patent Application No. PCT/JP2022/041492 filed on Nov. 8, 2022, which designated the U.S. and claims the benefit of priority from Japanese Patent Application No. 2021-185158 filed on Nov. 12, 2021. The entire disclosures of all of the above applications are incorporated herein by reference.

TECHNICAL FIELD

The present disclosure relates to a vehicle travel control device.

BACKGROUND

Conventionally, techniques for supporting forward parallel parking into a parking space are known. For example, in the drive assist device according to a conceivable technique, the left and right front wheels are driven in different directions by hub motors. The left and right rear wheels are turned in the direction toward the parking space. It is designed to enable parking even in narrow parking spaces with little effort of a driving operation.

SUMMARY

According to an example, a vehicle travel control device controls an independent turn wheel vehicle or a swivel three-wheeled vehicle having three or more wheels. The device instructs a turn with a normal driving operation, instructs a pivot turn for setting one wheel as a turning center and driving other wheels using a target instruction value, turns each wheel individually according to the turning center of the pivot turn, and brakes and drives each wheel individually. Further, the device acquires vehicle characteristics from a vehicle characteristic storage device, and calculate a turn wheel angle and a drive direction of each wheel based on the target instruction value to execute the pivot turn of the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
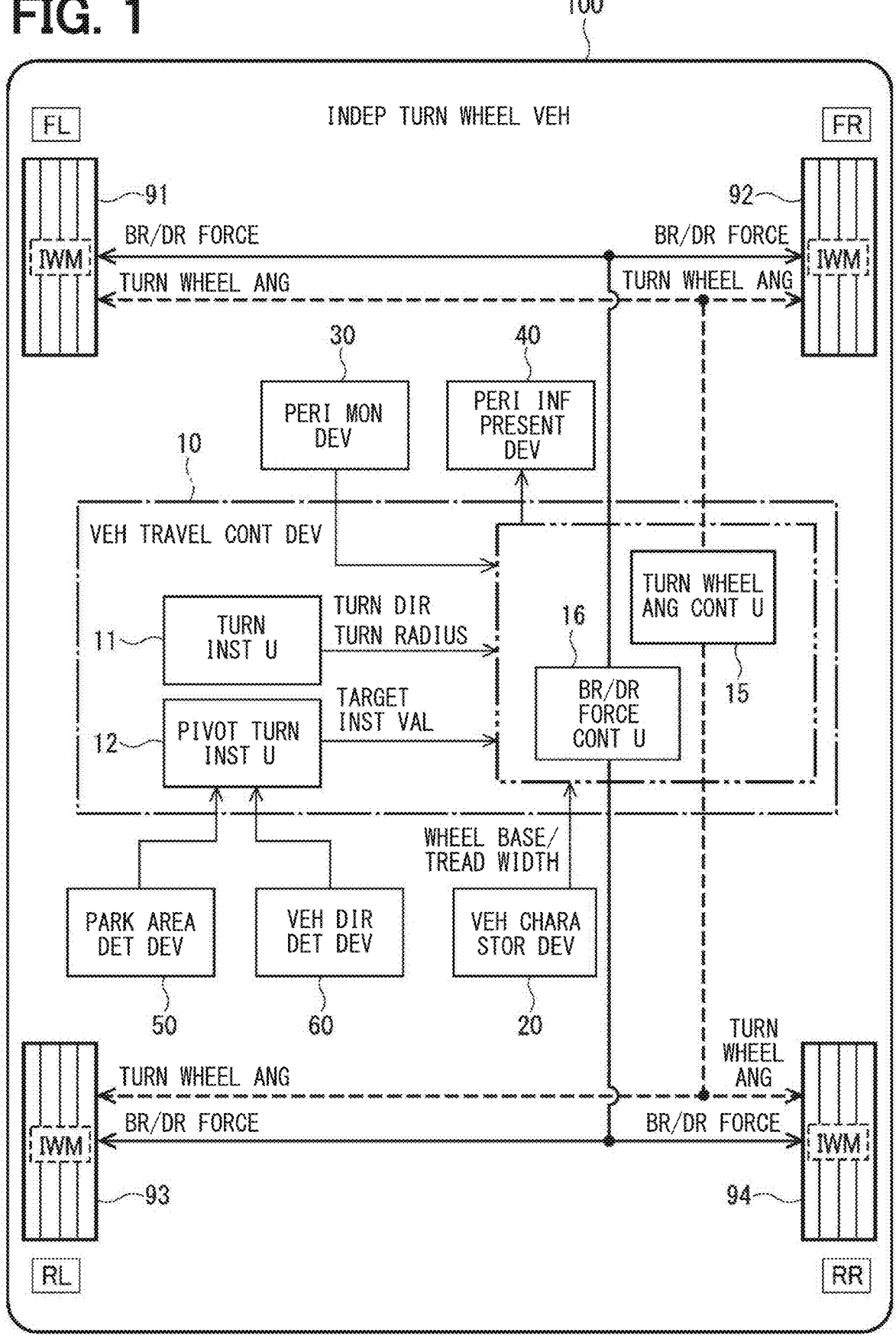
FIG. 1 is a block diagram of a vehicle travel control device according to the present embodiment.

Regarding the horizontal rotation of the vehicle in the state according to the conceivable technique, the center of rotation of the front wheels is the midpoint between the left and right front wheels, and the center of rotation of the rear wheels is a point on the right front side of the vehicle. Since the center of rotation of the front wheels and the center of rotation of the rear wheels are different, the skidding loads are applied to the tires during driving, so that the required driving force and the loss are increased. Also, the traveling trajectory cannot be controlled.

The present embodiments provide a vehicle travel control device that enables quick forward parallel parking even in a narrow parking space.

The vehicle travel control device according to the present embodiments is applicable to an independent turn wheel vehicle in which three or more wheels can be turned independently, or a three-wheeled vehicle that has two front wheels and one rear wheel and whose rear wheel can be turned freely so that the travel of the vehicle is controlled. This vehicle travel control device includes a turn instruction unit, a pivot turn instruction unit, a turn wheel angle control unit, and a brake and drive force control unit.

The turn instruction unit instructs a turn during normal travel. The pivot turn instruction unit instructs a pivot turn in which, when the vehicle turns, one tire is used as a turning center and the other tires are driven, using a target instruction value.

The turn wheel angle control unit and the brake and drive force control unit acquire vehicle characteristics from a vehicle characteristic storage device. The turn wheel angle control unit individually turns each tire in accordance with the center of the pivot turn instructed by the pivot turn instruction unit, and the brake and drive force control unit causes each tire to be braked or driven individually.

The turn wheel angle control unit and the brake and drive force control unit calculate the turn wheel angle and the drive direction of each tire from the target instruction value, and cause the vehicle to execute a pivot turn.

In an independent turn wheel vehicle, by utilizing independent turn of each tire and pivot turn with brake and drive, it is possible to quickly and easily perform forward parallel parking even in a narrow parking space. In addition, in a swivel three-wheeled vehicle, by utilizing the turn of one rear wheel and a pivot turn with brake and drive, it is possible to quickly and easily perform forward parallel parking even in a narrow parking space.

A vehicle travel control device according to an embodiment of the present embodiments will be described with reference to the drawings. The first embodiment is the basic feature, and the second to fourth embodiments have optional functions added to the first embodiment. The following first to fourth embodiments are collectively referred to as "present embodiment". The vehicle travel control device of this embodiment controls the travel of a vehicle in an independent turn wheel vehicle in which each tire can be steered and turned independently. In addition, in "other embodiments" to be described later, the vehicle travel control device controls the travel of the swivel three-wheeled vehicle. The independent turn wheel vehicles and the swivel three-wheeled vehicles are not limited to those driven by a driver, but also include autonomous driving vehicles.

Conventionally, in a general vehicle, a pair of left and right tires are mechanically connected via a link, and the tires are turned by steering operation of a steering wheel. In the future, it is thought that steer-by-wire systems, in which the steering and left and right tire links are mechanically separated, and four-wheel independent turn wheel vehicles, in which not only the left and right front wheels but also the left and right rear wheels can be turned independently, will develop. For example, in a four-wheel independent turn wheel vehicle, each wheel is turned independently, so that it is possible to turn with a defined turn center, to rotate on the spot, and the like.

First Embodiment

The configuration of a vehicle travel control device 10 according to this embodiment will be described with reference to FIGS. 1 to 3. In the independent turn wheel vehicle 100 shown in FIG. 1, all four tires 91-94 can be turned independently. Each tire 91-94 is equipped with an in-wheel motor ("IWM" in the drawing) and a brake mechanism that generate braking and driving force, and a turning wheel mechanism that turns the tire. The front left wheel 91 is defined as "FL", the front right wheel 92 is defined as "FR", the rear left wheel 93 is defined as "RL", and the rear right wheel 94 is defined as "RR".

In addition to the vehicle travel control device 10, the vehicle 100 is equipped with at least a vehicle characteristic storage device 20 that stores vehicle characteristics. The vehicle characteristics stored in the vehicle characteristics storage device 20 include vehicle dimensions such as the wheelbase and the tread width. The periphery monitor device 30, the periphery information presentation device 40, the park area detection device 50, and the vehicle direction detection device 60 other than the vehicle characteristic storage device 20 are appropriately mounted in the vehicle to which the second to fourth embodiments are applied. The functions of these devices will be described later in the description of the second to fourth embodiments.

The vehicle travel control device 10 includes a turn instruction unit 11, a pivot turn instruction unit 12, a turn wheel angle control unit 15, and a brake and drive force control unit 16. The turn instruction unit 11 instructs the turn direction and the turn radius while turning with the normal driving. The pivot turn instruction unit 12 instructs "a pivot turn" in which, when turning the vehicle, one tire is used as a center and the other tires are driven, using a target instruction value.

Figure 2A:
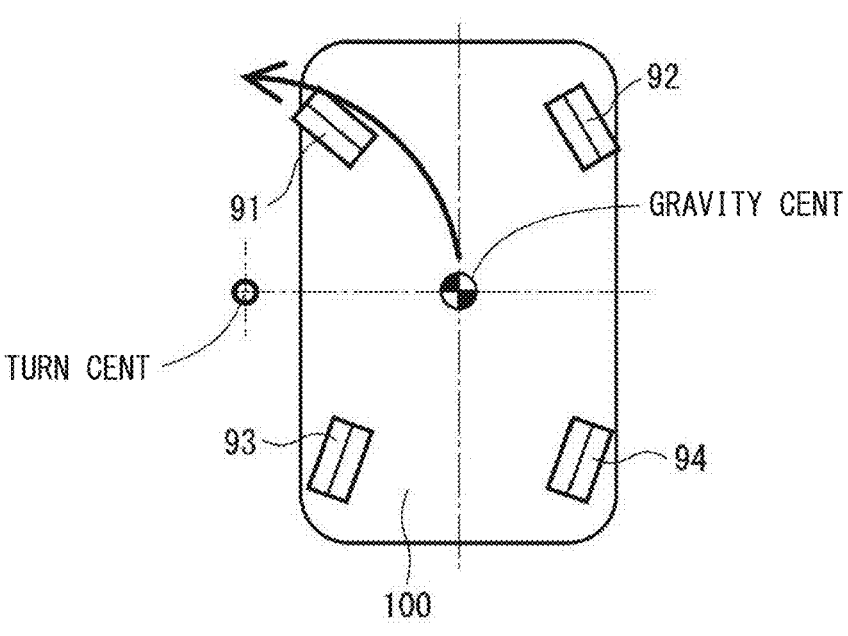
FIG. 2A is a diagram illustrating a turn during normal driving in an independent turn wheel vehicle.
Figure 2B:
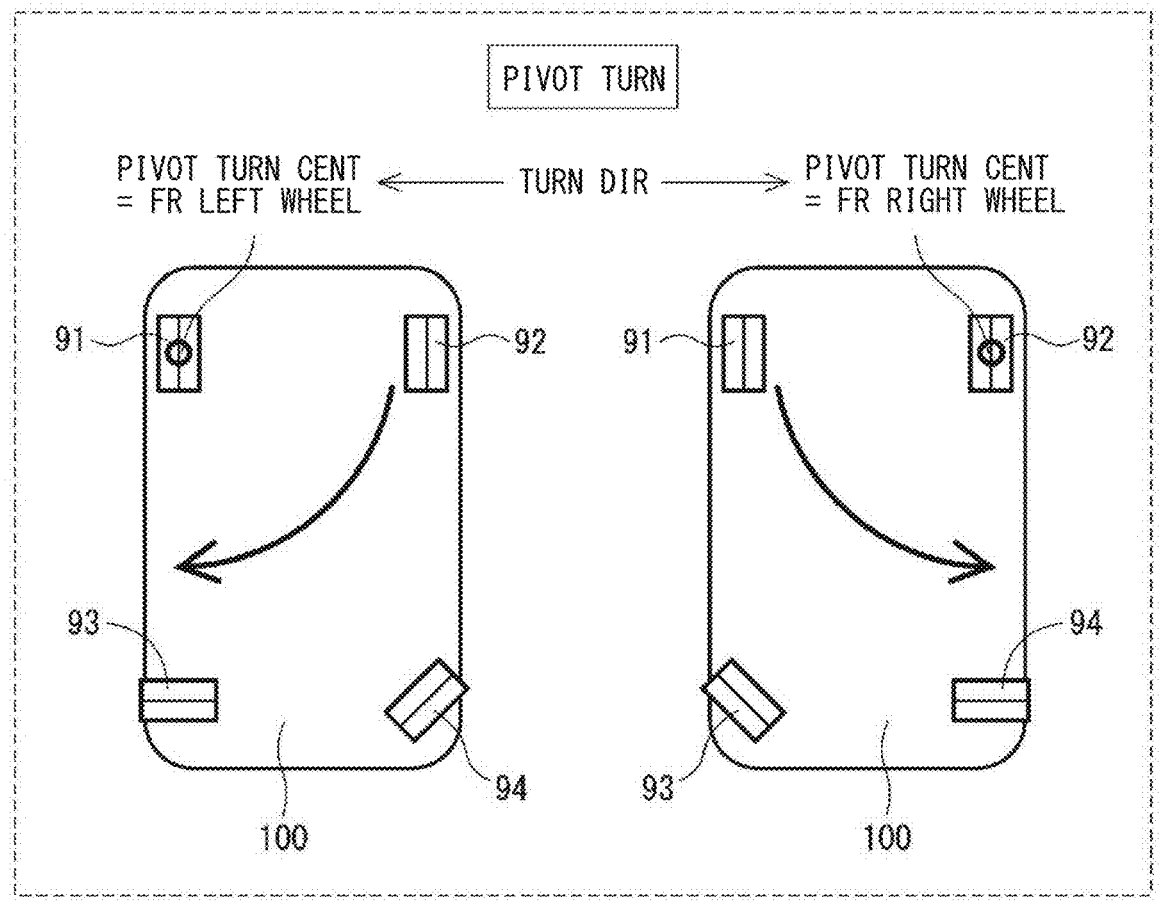
FIG. 2B is a diagram illustrating a pivot turn in an independent turn wheel vehicle.

As shown in FIG. 2A, when turning with the normal driving similar to a general vehicle, a point outside the vehicle becomes the turning center. For example, in the case of a left turn, a point on the left side of the vehicle is the turning center. As shown in FIG. 2B, the independent turn wheel vehicle 100 is capable of pivot turning around any one tire. The pivot turn instruction unit 12 determines the center of the pivot turn according to the turning direction.

For example, when pulling the vehicle to the left edge of the road and parallel parking after turning left, the front left wheel 91 is set as the pivot turning center, and the other tires 92, 93, and 94 are turned and driven in the tangential direction of the turning circle, so that the vehicle is turned to swing the rear of the vehicle to the left. On the other hand, when pulling the vehicle to the right edge of the road and parallel parking after turning right, the front right wheel 92 is set as the pivot turning center, and the other tires 91, 93, and 94 are turned and driven in the tangential direction of the turning circle, so that the vehicle is turned to swing the rear of the vehicle to the right.

The turn wheel angle control unit 15 and the brake and drive force control unit 16 acquire vehicle characteristics from a vehicle characteristic storage device 20. The turn wheel angle control unit 15 outputs an instruction signal to the turn wheel mechanism to individually turn each tire 91-94 according to the center of the pivot turn instructed by the pivot turn instruction unit 12. The brake and drive force control unit 16 outputs an instruction signal to the in-wheel motor and the brake mechanism to individually brake and drive each tire 91-94. The turn wheel angle control unit 15 and the brake and drive force control unit 16 calculate the turn wheel angle and the drive direction of each tire 91-94 from the target instruction value, and cause the vehicle to execute a pivot turn.

Figure 3:
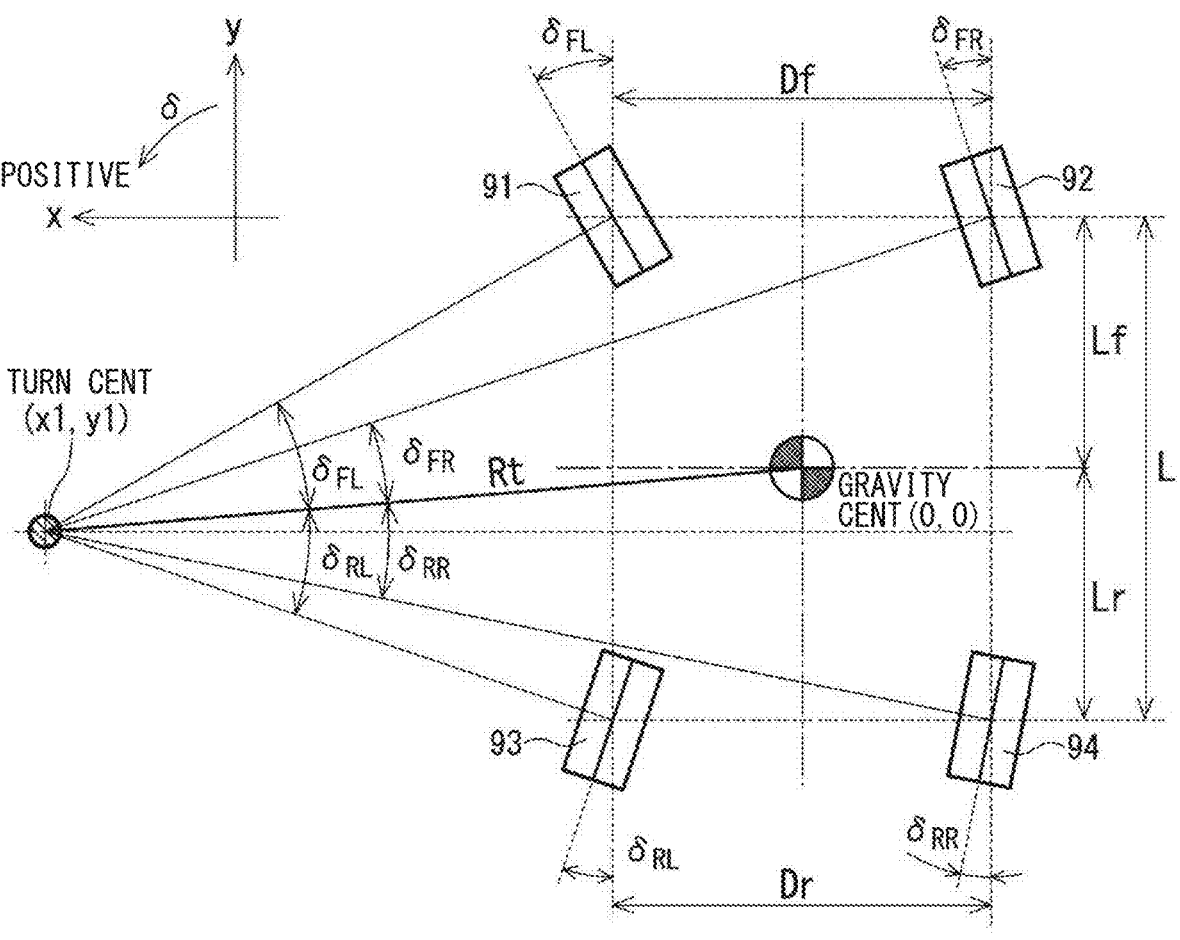
FIG. 3 is a diagram illustrating an example of calculation of the turn wheel angle during turning with normal driving.

FIG. 3 shows an example of calculation of the turn wheel angle by the turn wheel angle control unit 15 when turning with the normal driving. The x-y coordinates are defined so that the vehicle center of gravity is defined as the origin (0,0), and the vehicle left-right axis is defined as the x-axis, and the vehicle front-rear axis is defined as the y-axis. The x-axis has a positive direction on the right and a negative direction on the left, and the y-axis has a positive direction on the front and a negative direction on the rear. The coordinates of the turning center is defined as (x1, y1). When a situation is described as an example such that the vehicle turns left to execute the parallel parking on the left edge of the road, the center of the turn is disposed on the left side of the vehicle, so that the equation of "x1<0" is satisfied.

The turn wheel angle is calculated so that the rotational direction of each tire 91-94 is perpendicular to the straight line connecting the center of each tire 91-94 and the turning center. The turning radius Rt is the distance between the turning center and the center of gravity, and is expressed by expression (1).

$$Rt = \sqrt{\left(x1^2 + y1^2\right)} \qquad (1)$$

The wheelbase L and the tread widths Df and Dr of the vehicle are acquired from the vehicle characteristic storage device 20. The distance from the center of gravity to the axes of the front wheels 91 and 92 in the y-axis direction is represented by Lf, and the distance from the center of gravity to the axes of the rear wheels 93 and 94 is represented by Lr. The turn wheel angles δFL, δFR, δRL, and δRR of each tire 91-94 are expressed as tangent values according to expressions (2.1) to (2.4), with the counterclockwise direction being positive. The subscripts "FL, FR, RL, and RR" in FIG. 3 are written in regular characters in the specification.

$$\tan \delta FL = (Lf - y1)/\{|x1| - (Df/2)\} \qquad (2.1)$$

$$\tan \delta FR = (Lf - y1)/\{|x1| + (Df/2)\} \qquad (2.2)$$

$$\tan \delta RL = (Lr + y1)/\{|x1| - (Dr/2)\} \qquad (2.3)$$

$$\tan \delta RR = -(Lr + y1)/\{|x1| + (Dr/2)\} \qquad (2.4)$$

Next, with reference to FIGS. 4 to 7, difficulties of the conceivable technique in forward parallel parking and solutions to the difficulties by the first embodiment will be described. The parallel parking in reverse is generally a difficult driving maneuver. Furthermore, in order to park the vehicle in reverse, the driver may feel the psychological pressure to make the following vehicle wait since the driver temporary stops the vehicle and switches the travelling direction from the forward to the reverse. Therefore, it may be desirable to be able to parallel park while moving forward as much as possible.

Figure 4:
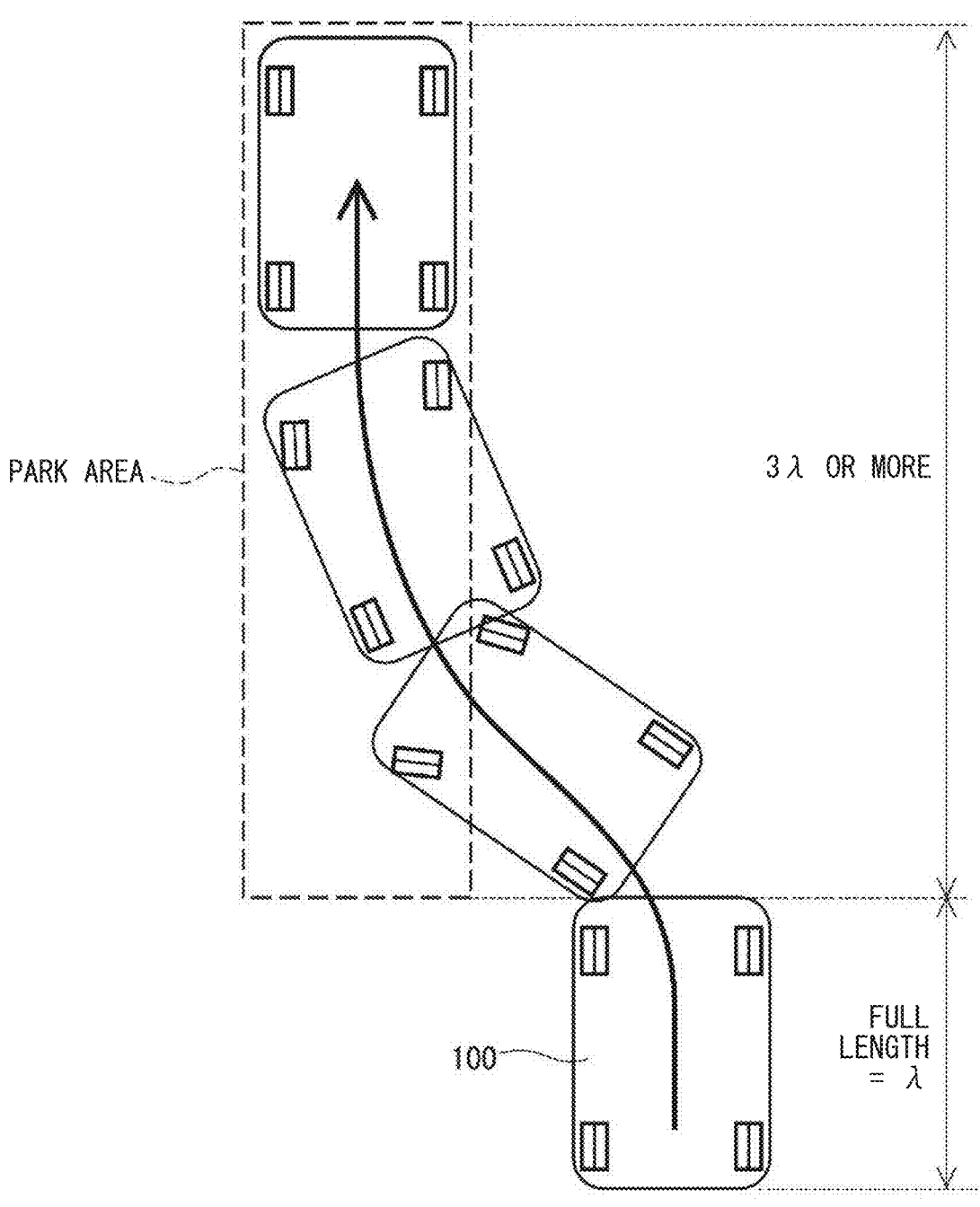
FIG. 4 is a diagram illustrating the difficulty of forward parallel parking.

However, as shown in FIG. 4, in order to complete the parallel parking when moving forward, it is necessary to secure a parking area that is approximately three times longer than the overall vehicle length A. Therefore, there is a difficulty that the parking is not possible in narrow space.

Figure 5:
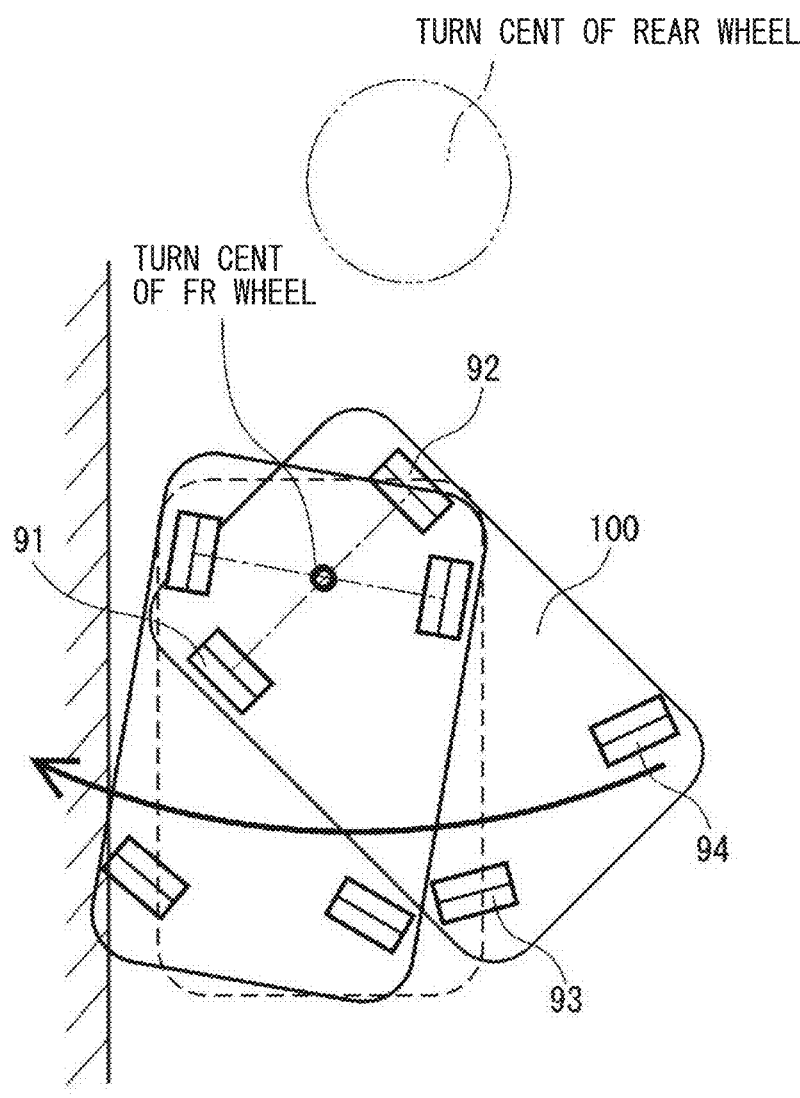
FIG. 5 is a diagram illustrating the difficulty of a turn according to a comparative example.

To solve this difficulty, in a comparative example corresponding to the conceivable technique, the left and right front wheels are driven in different directions, and the left and right rear wheels are turned to rotate the vehicle. As shown in FIG. 5, the center of rotation of the front wheels 91 and 92 is the midpoint of the left and right front wheels. The rotation center of the rear wheels 93 and 94 is disposed at the right front side of the vehicle, but is not precisely specified. Since the center of rotation of the front wheels and the center of rotation of the rear wheels are different, the skidding loads are applied to the tires during driving, so that the required driving force and the loss are increased. Furthermore, since the turning center of the rear wheels is not specified, depending on the setting of the turning center, there is a possibility that the vehicle may contact the road edge or deviate significantly from the road edge when turning.

Figure 6:
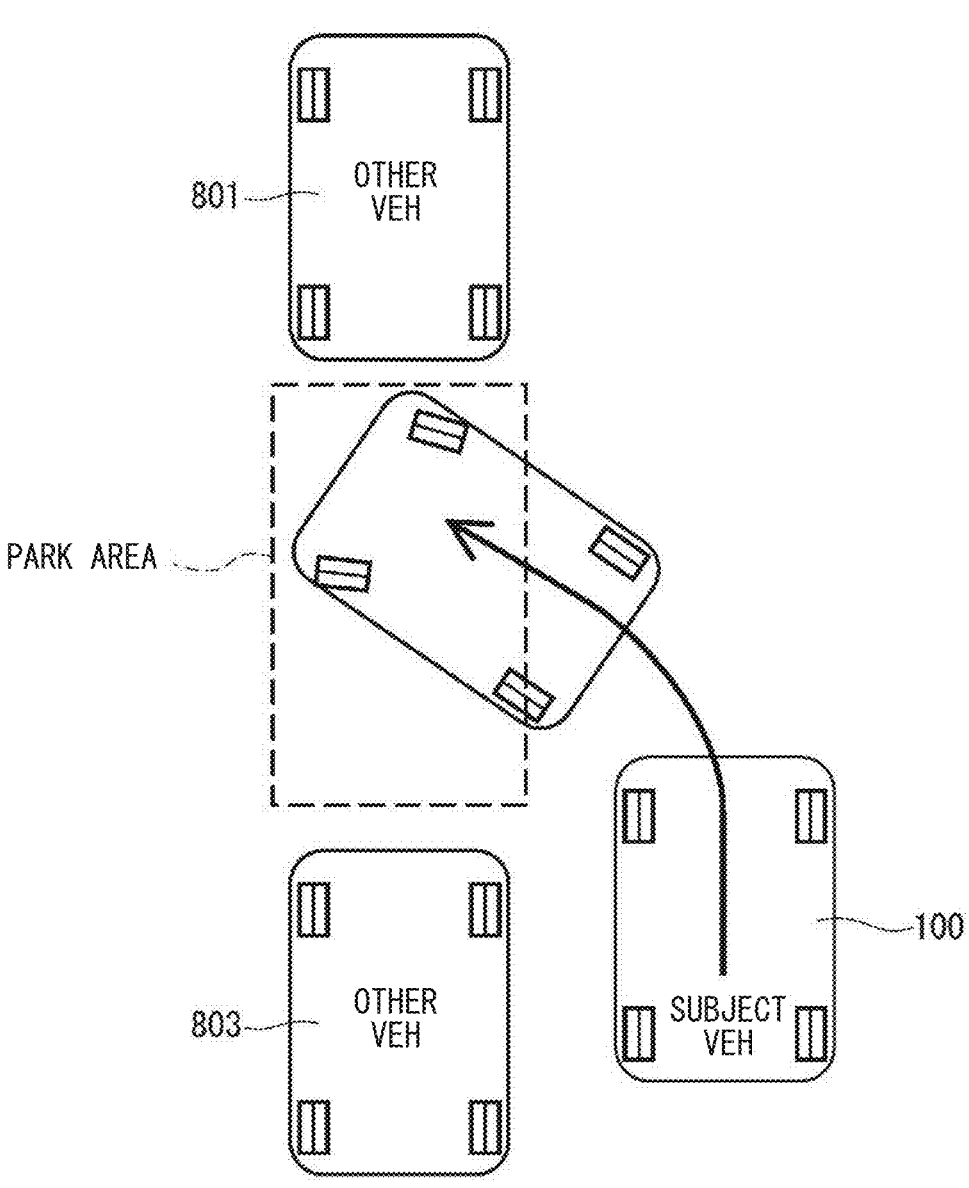
FIG. 6 is a diagram showing a turning operation in the forward parallel parking of the four-wheel independent turn wheel vehicle according to the first embodiment.
Figure 7:
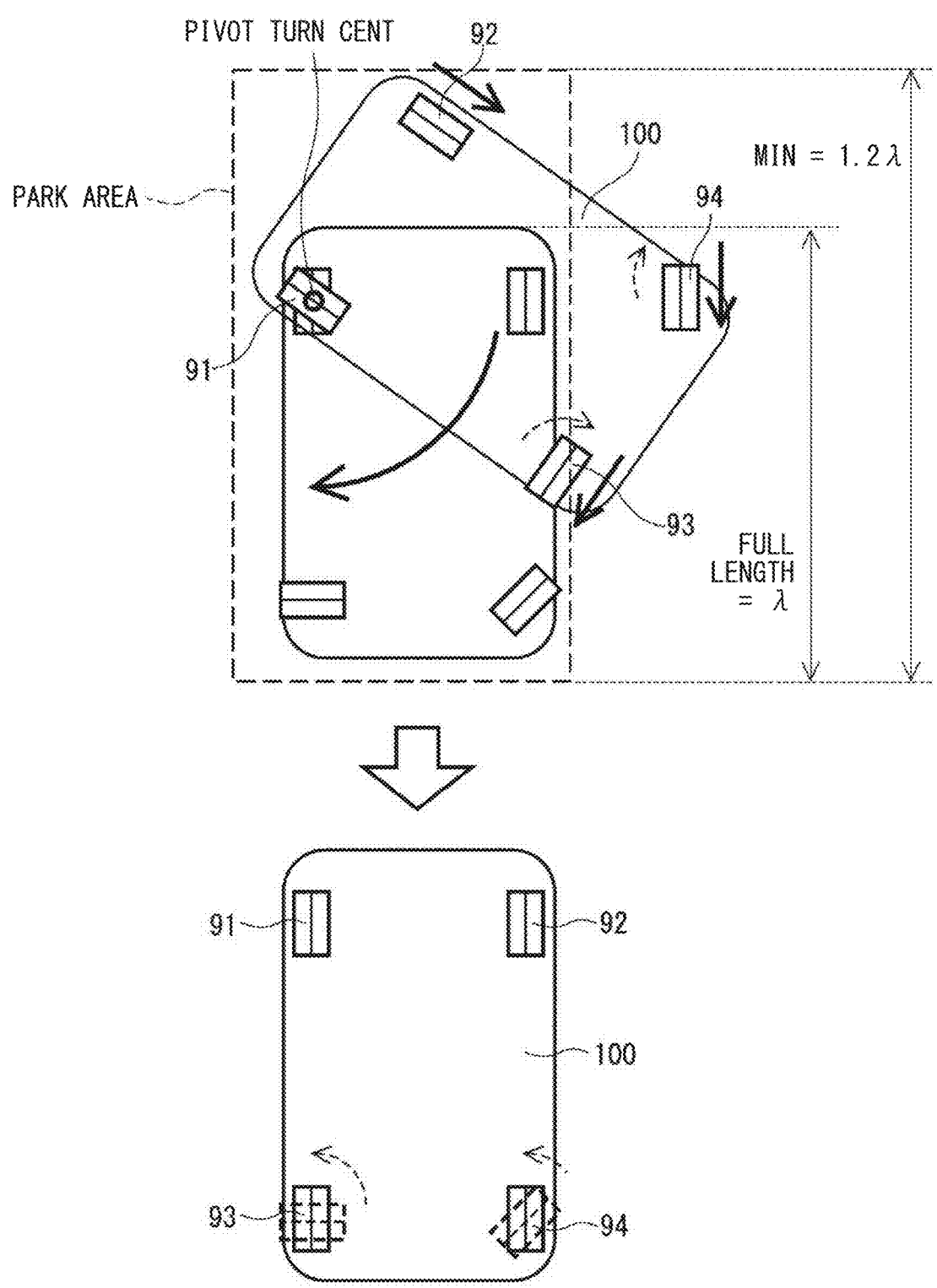
FIG. 7 is a diagram showing the turning operation of the four-wheel independent turn wheel vehicle following FIG. 6.

Next, with reference to FIGS. 6 and 7, the operation of the turning and the pivot turning of the four-wheel independent turn wheel vehicle 100 in the forward parallel parking will be described. As shown in FIG. 6, the subject vehicle 100 turns to the left while moving forward, enters a parking area between other vehicles 801 and 802 parked in front and behind, and stops.

Subsequently, as shown in the upper part of FIG. 7, based on the target instruction value of the pivot turn instruction unit 12, the vehicle travel control device 10 performs a pivot turn around the left front wheel 91 as the turning center, and turns the vehicle 100. Thin broken arc arrows attached to the rear wheels 93 and 94 indicate the turn wheel direction. Thick solid straight arrows attached to the right front wheel 92 and the rear wheels 93 and 94 represent the driving force. As shown in the lower part of FIG. 7, after the pivot turn, the vehicle travel control device 10 turns each tire (mainly the rear wheels 93, 94) so as to return them to their initial positions. In this way, the forward parallel parking is completed.

According to the first embodiment, the parallel parking is possible in a parking area that is approximately 1.2 times the vehicle overall length A at the shortest. The length of approximately 1.2 times corresponds to the distance required for parallel parking in reverse. In other words, in the first embodiment, the parallel parking in forward can be performed in a parking space equivalent to the parking in reverse and more quickly than the parking in reverse.

Further, in contrast to the conceivable technique in Patent Literature 1, in the first embodiment, the turn wheel angles of the other tires 92 to 94 are adjusted so that the left front wheel 91 becomes the center of turning, so that it is possible to park the vehicle 100 by pulling the vehicle to the edge of the road.

Figure 8:
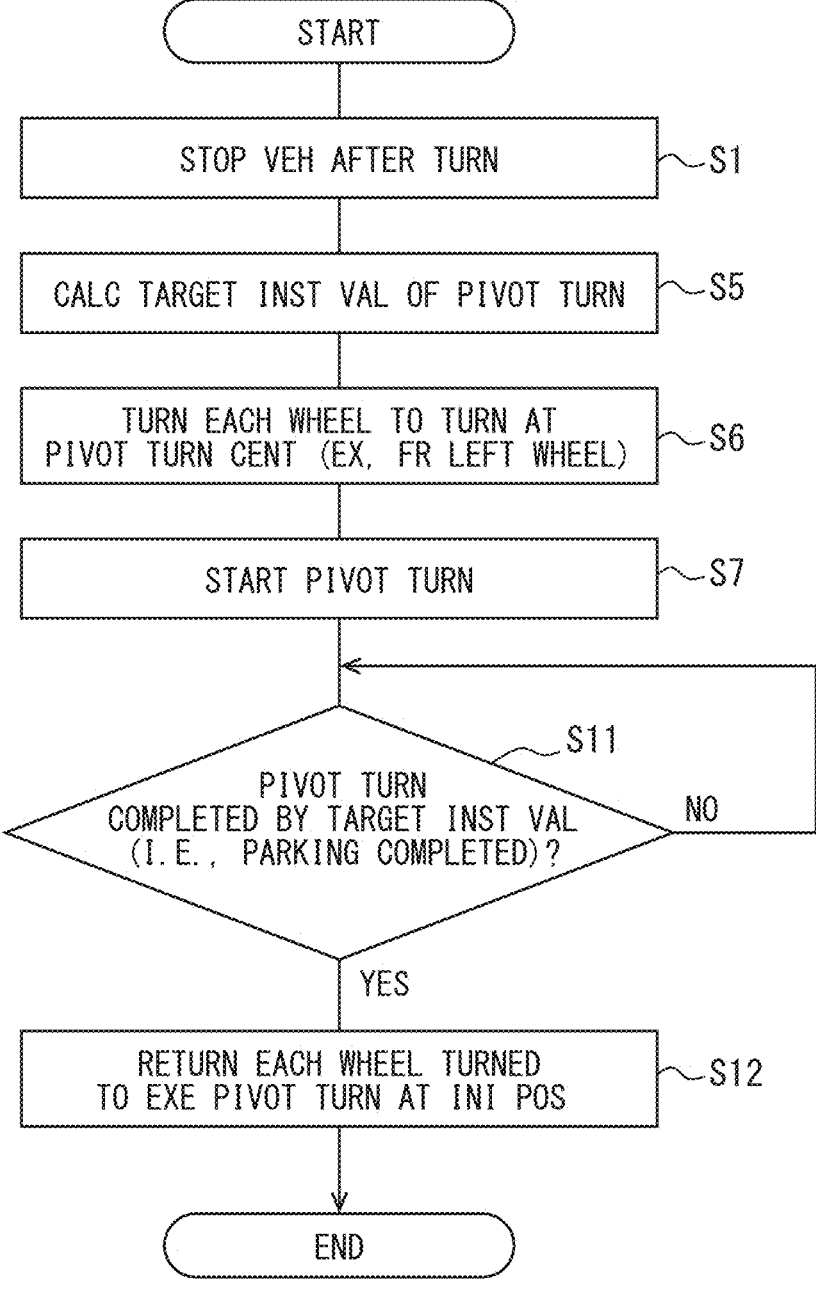
FIG. 8 is a flowchart of the forward parallel parking according to the first embodiment.
Figure 13:
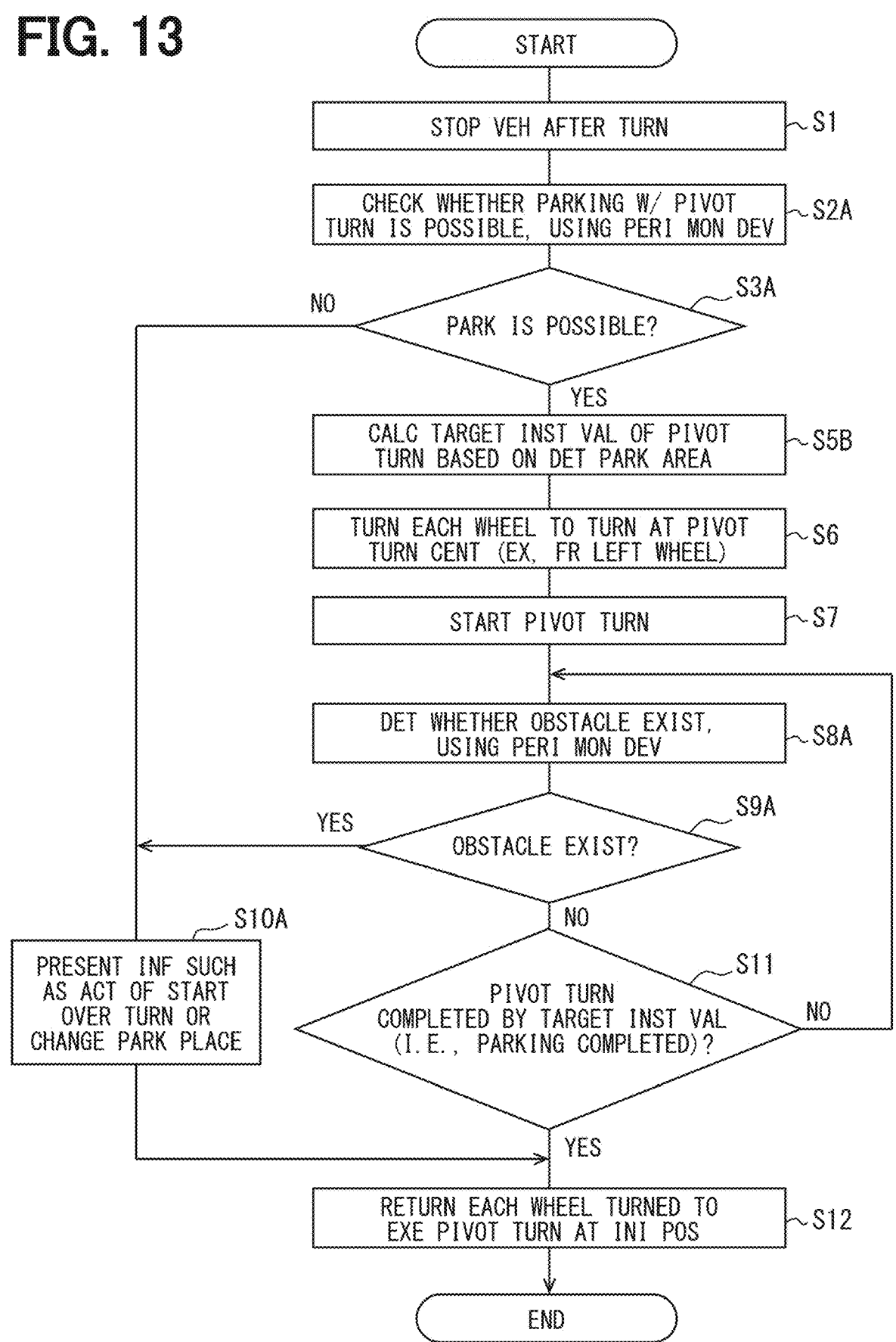
FIG. 13 is a flowchart of the forward parallel parking according to the second embodiment and the third embodiment.
Figure 15:
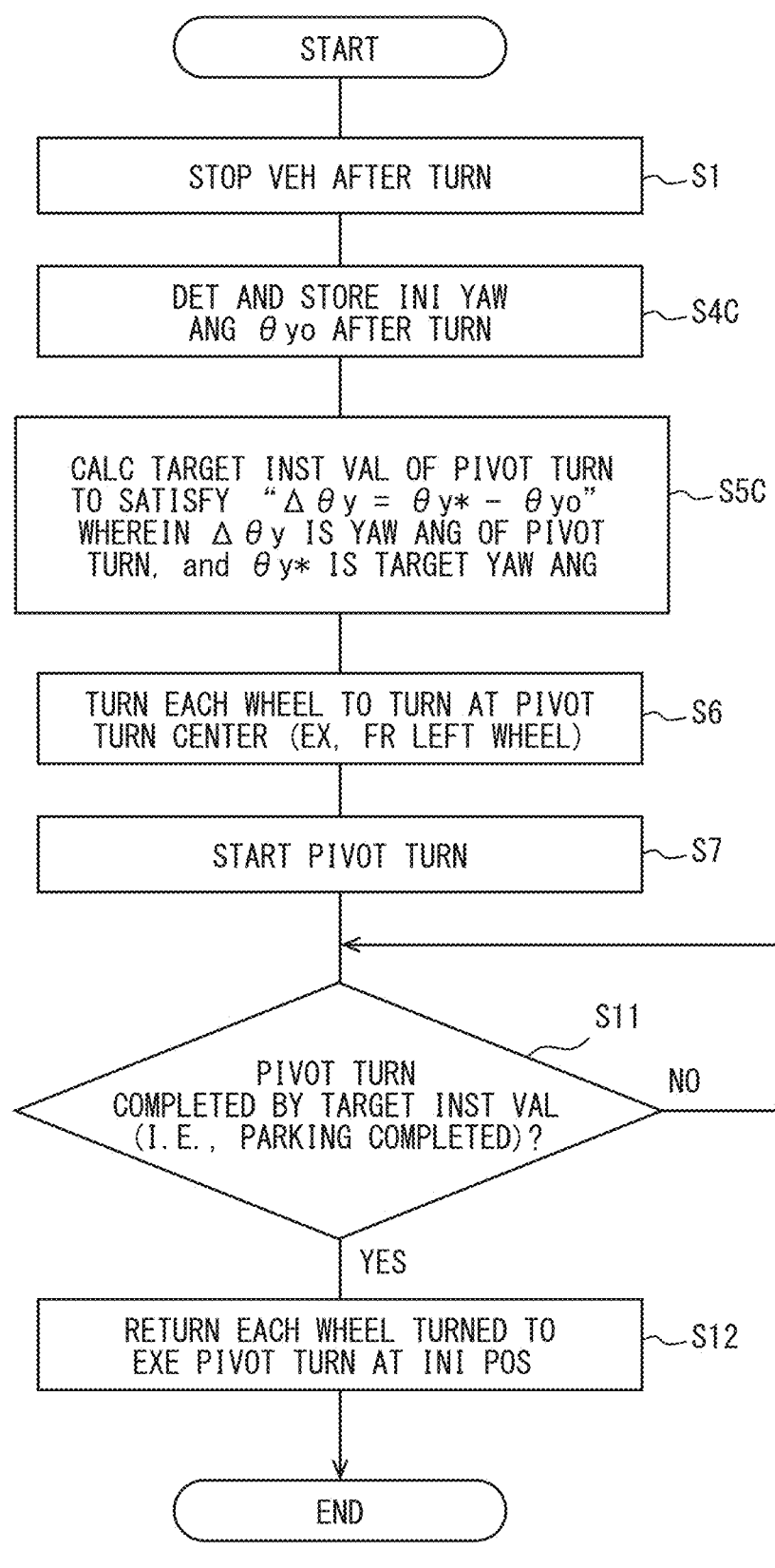
FIG. 15 is a flowchart of the forward parallel parking according to the fourth embodiment.

The flowchart in FIG. 8 shows a forward parallel parking routine according to the first embodiment. In the following flowchart, a symbol S may indicate a process. Substantially the same steps in FIG. 8, FIG. 13, and FIG. 15 are given the same step numbers and their explanations will be omitted. Therefore, step numbers may not be consecutive.

In S1, the vehicle 100 turns and stops. In S5, the pivot turn instruction unit 12 calculates a target instruction value for the pivot turning. In S6, the turn wheel angle control unit 15 turns each of the tires 91-94 so that the vehicle can turn at the pivot turning center (for example, the left front wheel 91) instructed by the pivot turn instruction unit 12. At S7, the turn wheel angle control unit 15 and the brake and drive force control unit 16 start executing the pivot turning.

In S11, it is determined whether the pivot turn has been completed to the target instruction value, that is, whether the parking has been completed. When the determination is "NO", the determination is repeated. When the pivot turn is completed and the determination is "YES" in S11, the turn wheel angle control unit 15 and the brake and drive force control unit 16 return the tires that have been turned for the pivot turn to the initial positions in S12.

As described above, according to the first embodiment, which is the basic feature, by utilizing the independent turn of each tire 91 to 94 and the pivot turn by the brake and the drive in the independent turn wheel vehicle 100, it is possible to quickly and easily control the vehicle in the forward parallel parking even if the parking space is narrow. Next, optional functions of the second to fourth embodiments added to the first embodiment will be explained in order.

Second Embodiment

Figure 9:
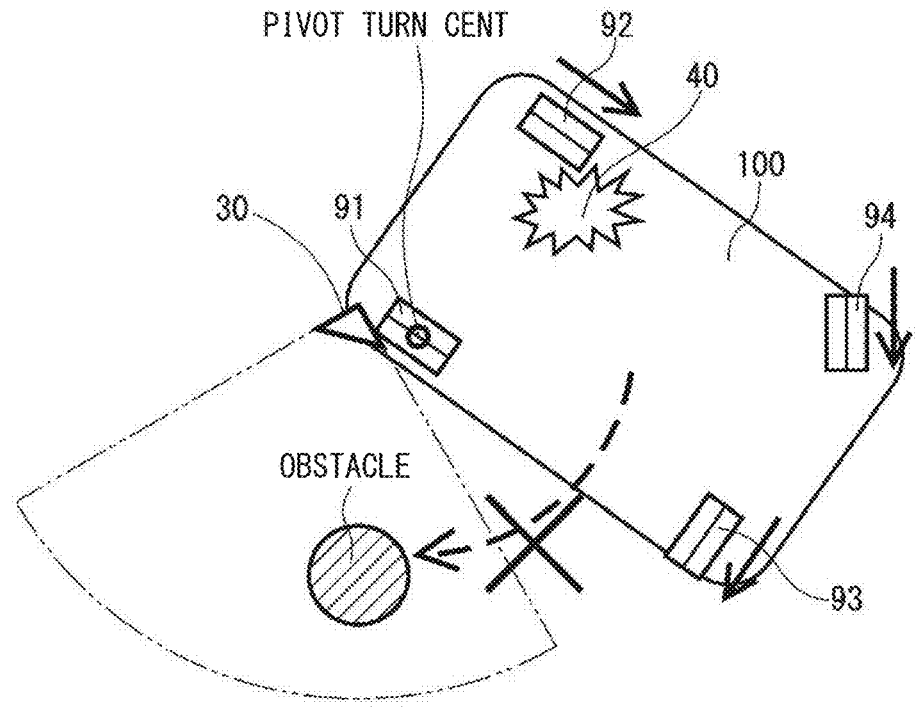
FIG. 9 is a diagram showing obstacle detection and information presentation according to the second embodiment.

FIGS. 1 and 9 are referred. In the second embodiment, the vehicle 100 is provided with a periphery monitor device 30 that detects an obstacle around the vehicle 100 and a periphery information presentation device 40 that presents information about the surroundings of the vehicle 100 to the passenger of the vehicle. For example, the periphery monitor device 30 is a sonar, a camera, LiDAR, or the like. For example, the periphery information presentation device 40 outputs a beep sound or displays an alert screen on a monitor. In FIG. 9, a star-shaped polygon mark represents the periphery information presentation device 40.

When the periphery monitor device 30 detects an obstacle before starting a pivot turn or in the middle of executing a pivot turn, the turn wheel angle control unit 15 and the brake and drive force control unit 16 calculate whether there is a possibility to contact with an object based on the position of the obstacle and the future trajectory of the vehicle. As a result, if there is a possibility to contact with an obstacle, the turn wheel angle control unit 15 and the brake and drive force control unit 16 cause the periphery information presentation device 40 to present the information. Further, the turn wheel angle control unit 15 and the brake and drive force control unit 16 avoid the contact with an obstacle by stopping the pivot turn at that position. The turn wheel angle control unit 15 and the brake and drive force control unit 16 cause the periphery information presentation device 40 to present information such as starting over the turn or changing the parking place.

When the driver drives the vehicle 100, it is possible to avoid the contact with the obstacle by detecting the peripheral obstacle with the periphery monitor device 30 such as a sonar and notifying the driver of the peripheral obstacle since the movement direction of the pivot turning is in a blind spot from the passenger position. Further, since the periphery information presentation device 40 notifies the passenger of whether or not a pivot turn is possible before starting a pivot turn, it is possible to easily execute the recovery operation such as starting over the turn.

Figure 10:
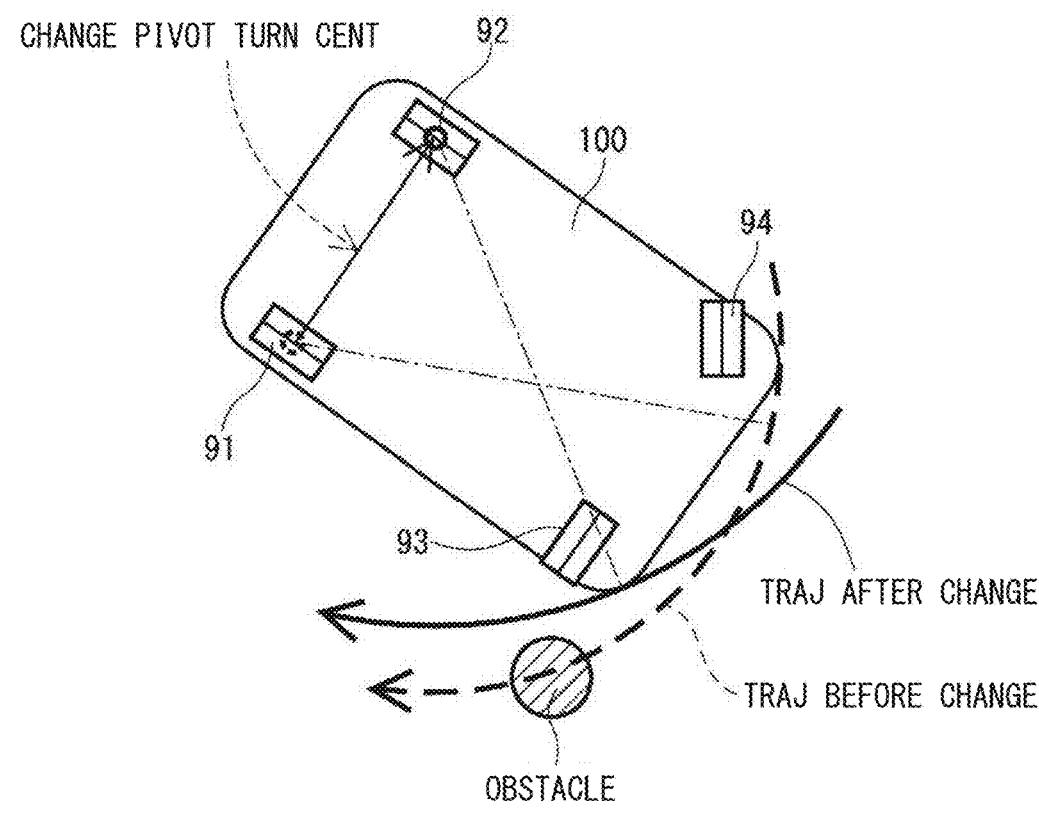
FIG. 10 is a diagram illustrating an example of operation when detecting an obstacle according to the second embodiment.

Referring to FIG. 10, an example of the operation when detecting an obstacle according to the second embodiment will be described. When estimating a possibility to contact with an obstacle, for example, the pivot turn instruction unit 12 changes the center of the pivot turn from the left front wheel 91 to the right front wheel 92, so that the trajectory of the pivot turn is changed to avoid the contact with the obstacle.

Figure 11:
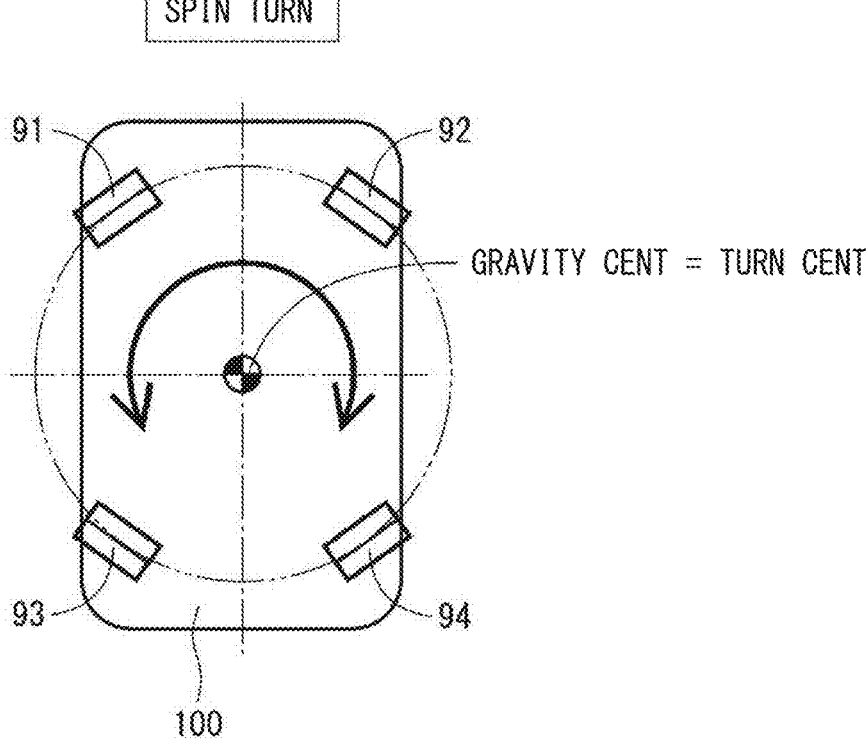
FIG. 11 is a diagram illustrating a spin turn.
Figure 12:
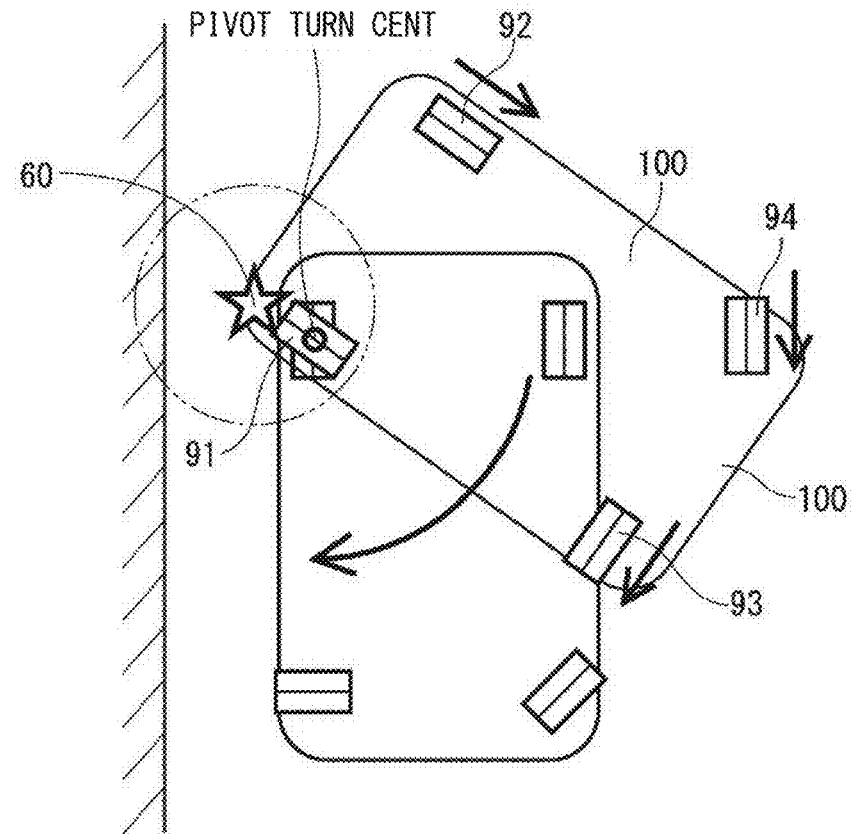
FIG. 12 is a diagram showing a detection of a parking area according to the third embodiment.

Alternatively, as a method of avoiding the contact with the obstacle, it is possible to execute the "spin turn" in the independent turn wheel vehicle 100. As shown in FIG. 11, in the spin turn, each tire 91-94 is turned in the tangential direction of the turning circle with the center of gravity of the vehicle 100 as the turning center. When rotating the vehicle on the spot in the spin turn, and rotates until the trajectory of the pivot turn is disposed at a position where the vehicle does not contact with an obstacle, it is possible to return to the pivot turn operation and to pull the independent turn wheel vehicle 100 to the edge of the road.

Third Embodiment

FIGS. 1 and 9 are referred. In the third embodiment, in addition to the configuration of the second embodiment, a park area detection device 50 for detecting a parking area is provided in the vehicle 100. For example, the park area detection device 50 is a sonar, a camera, LiDAR, and the like, and the periphery monitor device 30 may also serve as the function of the park area detection device 50. The park area detection device 50 detects a parking area based on, for example, white lines on a road, guardrails, sidewalks, and the like.

The pivot turn instruction unit 12 calculates a target instruction value for a pivot turn based on the parking area detected by the park area detection device 50. Automatic parking is possible by automatically executing a pivot turn to the detected parking area.

The flowchart in FIG. 13 shows a forward parallel parking routine that is a combination of the second embodiment and the third embodiment. The letter A is attached to steps related to the second embodiment a, and the letter B is attached to steps related to the third embodiment at the end of the step number. Description of steps substantially similar to those in FIG. 8 will be omitted. After S1, in S2A, the presence or absence of an obstacle is detected by the periphery monitor device 30 before the pivot turn, and it is confirmed whether or not the parking with the pivot turn is possible. In S3A, it is determined whether the parking is possible. If the parking is possible and the determination in S3A is "YES", the pivot turn instruction unit 12 calculates a target instruction value for the pivot turn based on the parking area detected by the park area detection device 50 in SSB.

Subsequently, after S6 and S7, in S8A, the presence or absence of an obstacle is detected by the periphery monitor device 30 in the middle of executing the pivot turn. In S9A, it is determined whether or not there is an obstacle. If there is no obstacle and the determination is "NO" in S9A, it is determined in S11 whether the pivot turn has been completed to the target instruction value. If the determination in S11 is "NO", the process returns to S7.

If the determination is "NO" in S3A before the pivot turn, that is, "the parking is not possible", or if the determination is "YES" in S9A in the middle of executing the pivot turn, that is, "there is an obstacle", the pivot turn instruction unit 12 causes the periphery information presentation device 40 to present information such as stating over the turn or changing the parking place in S10A.

Fourth Embodiment

Figure 14:
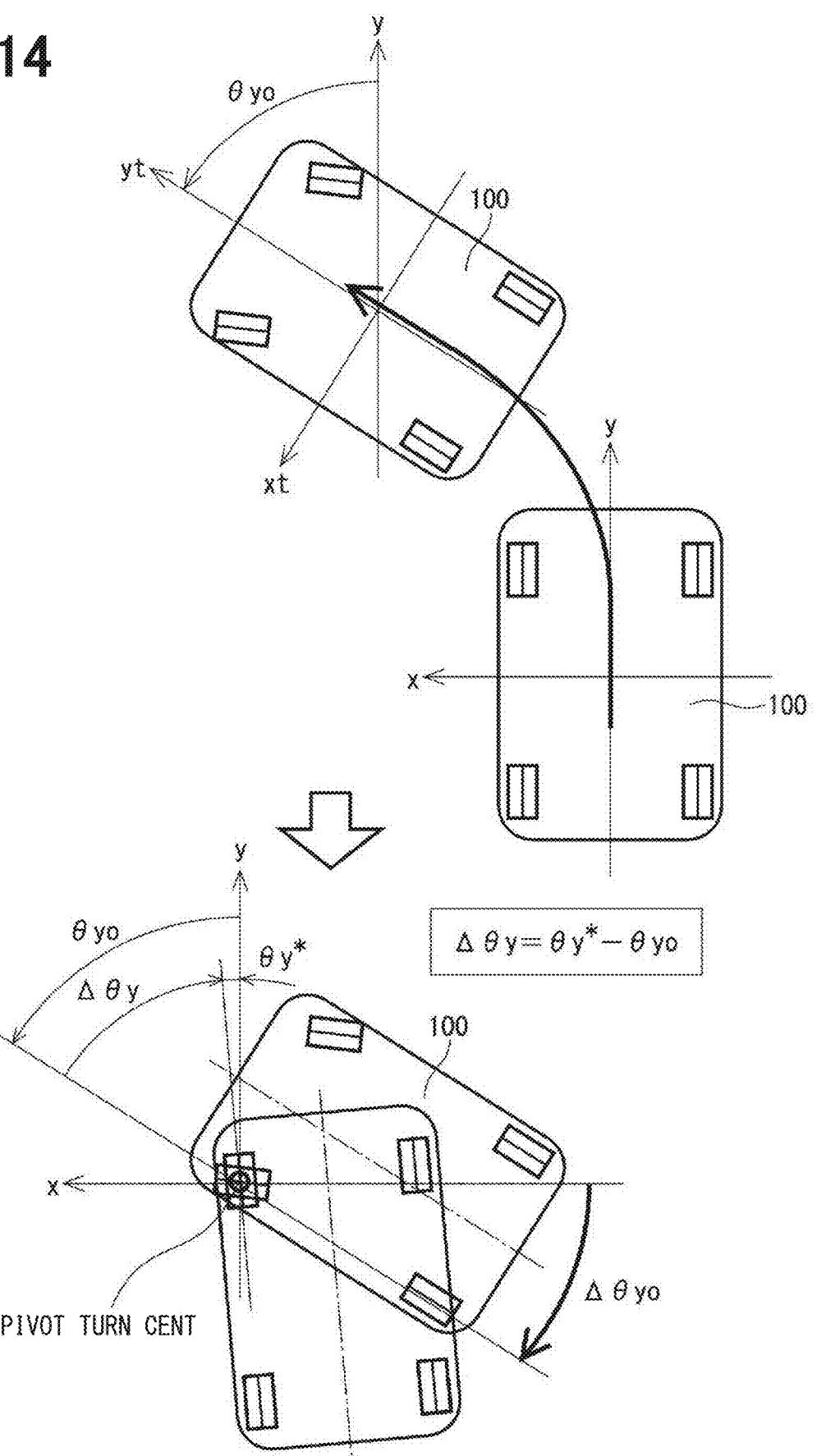
FIG. 14 is a diagram showing a pivot turn operation according to the fourth embodiment.

FIGS. 1 and 14 are referred. In the fourth embodiment, the vehicle 100 is provided with a vehicle direction detection device 60 that detects and stores the yaw angle of the vehicle 100. For example, the vehicle direction detection device 60 is a yaw rate sensor. The upper part of FIG. 14 shows a state in which the vehicle 100 has turned from moving forward. The left-right axis of the vehicle 100 before turning is represented by the x-axis and the front-rear axis is represented by the y-axis, and the left-right axis of the vehicle 100 after turning is represented by the xt-axis and the front-rear axis is represented by the yt-axis. The rotation angle from the y-axis to the yt-axis provides the initial yaw angle $\theta yo$ after turning.

The lower part of FIG. 14 shows a state in which the vehicle 100 has executed a pivot turn after turning. The target yaw angle after the pivot turn is expressed as $\delta y^*$. For example, the target yaw angle when the parallel parking is executed to be parallel to the edge of a straight road is defined as "$\delta y^*=0$". Here, when the parallel parking is executed on a curved road or the vehicle is parked in a parking space provided diagonally with respect to the straight-ahead direction, the target yaw angle $\delta y^*$ is set to a value other than 0.

The Pivot Turn Instruction Unit 12 Calculates the target instruction value for pivot turn so that the difference $\Delta \delta y$ between the initial yaw angle $\theta yo$ before the pivot turn of the vehicle 100 and the target yaw angle $\delta y^*$ after the pivot turn becomes the yaw angle $\Delta \delta y$ ($=\delta y^*-\theta yo$) of the pivot turn. When the expression of "$\delta y^*=0$" is satisfied, the expression of "$\Delta \delta y=-\theta yo$" is set. The pivot turn instruction unit 12 calculates a target instruction value so as to assign a yaw angle in the opposite direction, which has the same absolute value as the initial yaw angle $\theta yo$ detected and stored by the vehicle direction detection device 60. Thus, it is possible to prevent overshoot during a pivot turn without using the periphery monitor device 30, the park area detection device 50, or the like.

The flowchart in FIG. 15 shows a forward parallel parking routine according to the fourth embodiment. The letter C is attached to steps related to the fourth embodiment at the end of the step number. Description of steps substantially similar to those in FIG. 8 will be omitted. After S1, in S4C, the vehicle direction detection device 60 detects and stores the initial yaw angle θyo after turning.

In SSC, the pivot turn instruction unit 12 calculates the target instruction value for the pivot turn so that an expression of "yaw angle Δδy for the pivot turn=target yaw angle δy*−initial yaw angle θyo" is satisfied. S6, S7, S11, and S12 are the same as in FIG. 8.

Figure 16:
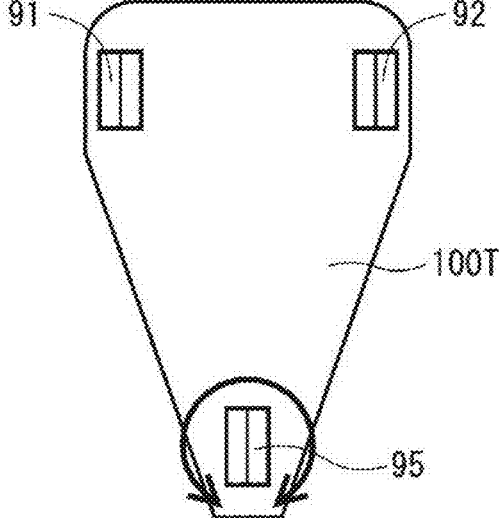
FIG. 16 is a diagram of a swivel three-wheeled vehicle to which a vehicle travel control device of another embodiment is applied.

Other Embodiments (a) The independent turn wheel vehicle 100 may not be limited to a four-wheel independent turn wheel vehicle, and may be any vehicle as long as three or more tires can be independently turned. Alternatively, as shown in FIG. 16, the vehicle travel control device of the present embodiments may be applied to a "swivel three-wheeled vehicle" 100T that includes two front wheels 91 and 92 and one rear wheel 95, and the rear wheel 95 can be steered freely.

Figure 17:
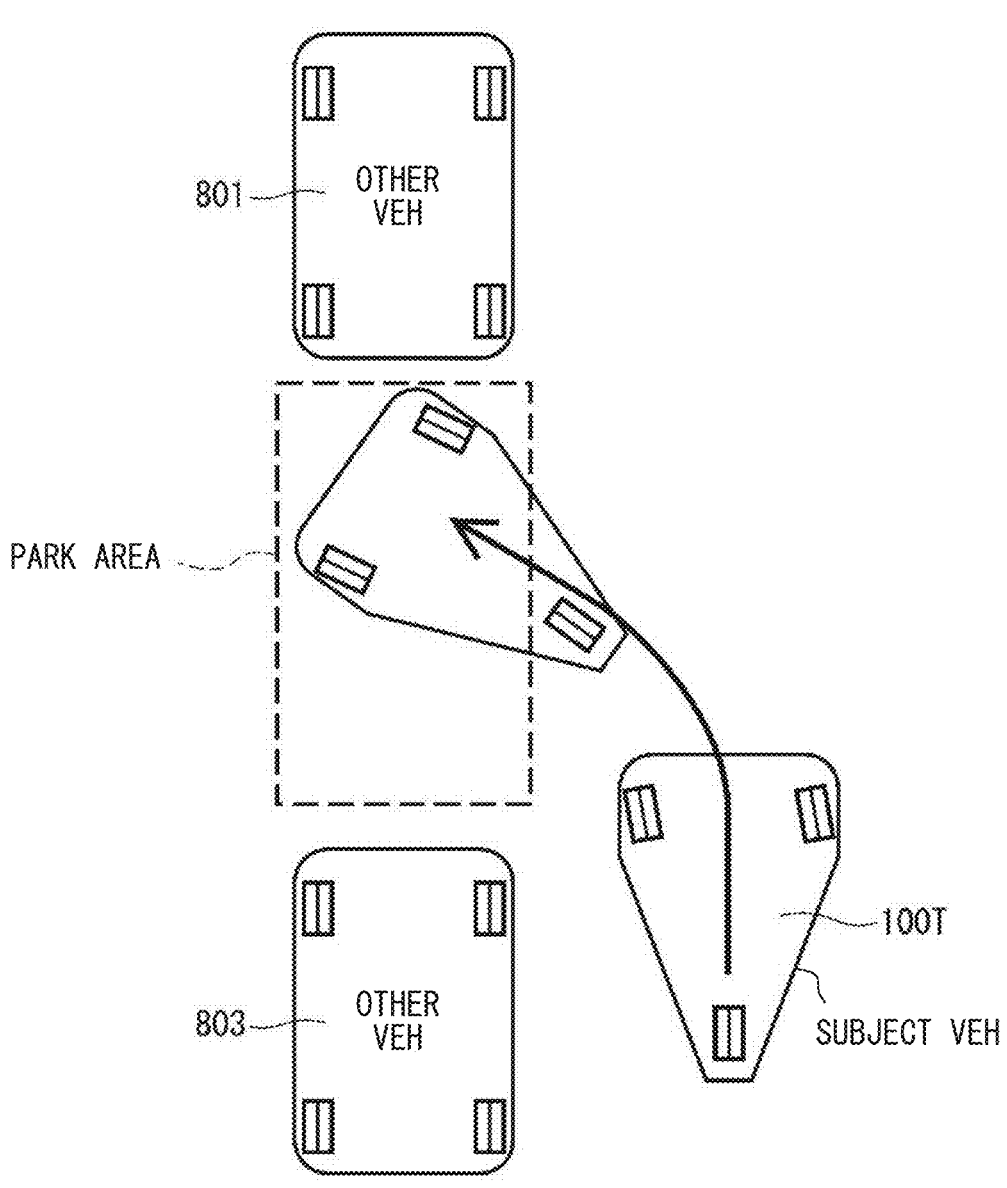
FIG. 17 is a diagram illustrating a turn operation in the forward parallel parking of a swivel three-wheeled vehicle according to another embodiment.
Figure 18:
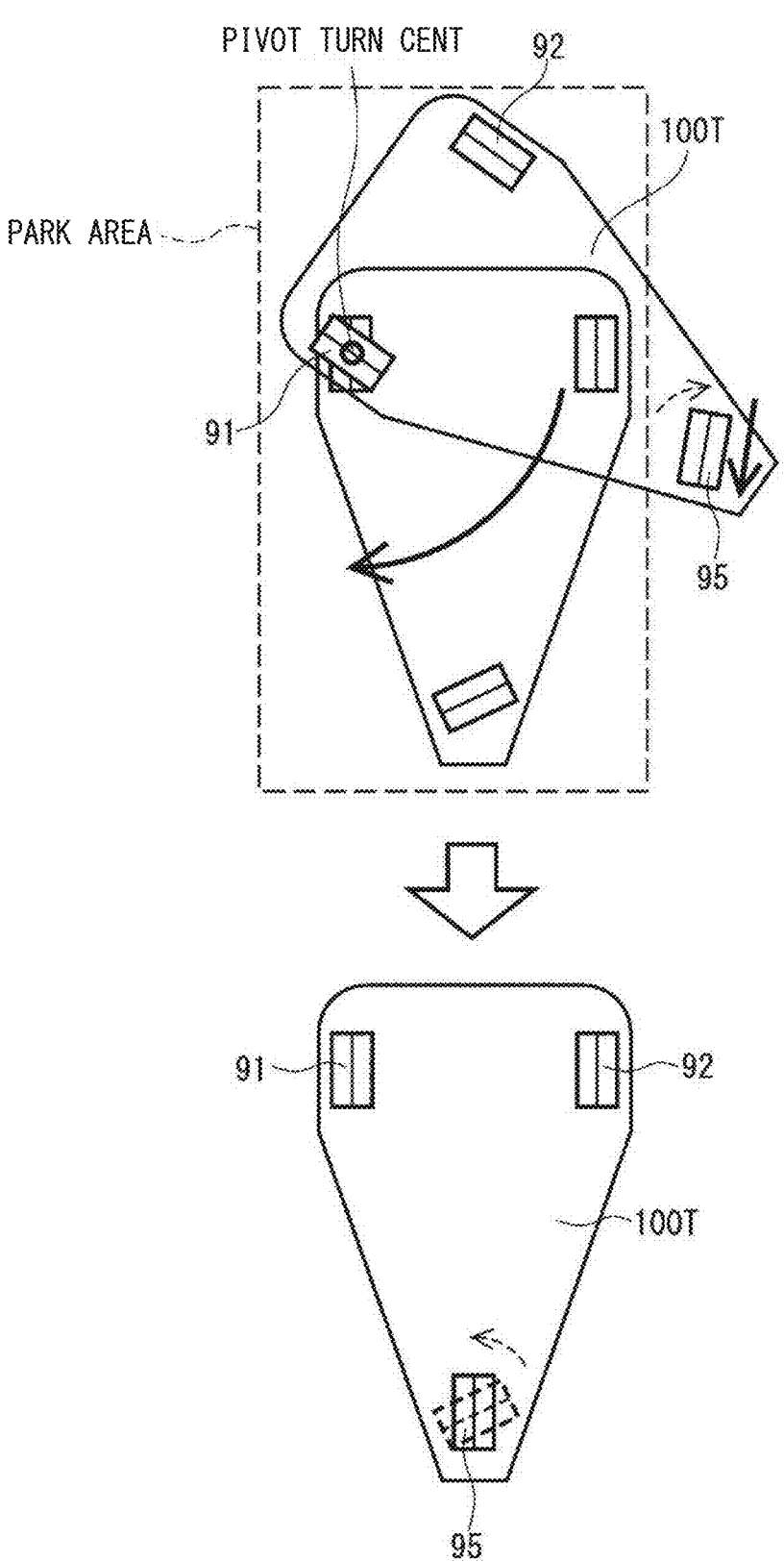
FIG. 18 is a diagram showing the pivot turn operation of the swivel three-wheeled vehicle following FIG. 17.

FIGS. 17 and 18 show the turning and the pivot turning operations of the swivel three-wheeled vehicle 100T in forward parallel parking. FIGS. 17 and 18 correspond to FIGS. 6 and 7 of the four-wheel independent turn wheel vehicle 100. As shown in FIG. 17, the subject vehicle 100T turns to the left while moving forward, enters a parking area between other vehicles 801 and 802 parked in front and behind, and stops.

Subsequently, as shown in the upper part of FIG. 18, a pivot turn around the left front wheel 91 as the turning center is performed. Similar to the four-wheel independent turn wheel vehicle 100, the center of the pivot turn is determined according to the turning direction. The thin broken line arc arrow attached to the rear wheel 95 represents the turning direction, and the thick solid line arrow represents the driving force. As shown in the lower part of FIG. 18, after the pivot turn, each tire (mainly the rear wheel 95) is turned to return to its initial position. In this way, the swivel three-wheeled vehicle 100T can also quickly and easily perform the forward parallel parking even in a narrow parking space by utilizing the pivot turn.

The present disclosure should not be limited to the embodiment described above. Various other embodiments may be implemented without departing from the scope of the present disclosure.

The control section and the method thereof of the present disclosure may be implemented by a dedicated computer provided by configuring a processor and a memory programmed to execute one or more functions embodied by a computer program. Alternatively, the control section and the method thereof described in the present disclosure may be implemented by a dedicated computer provided by configuring a processor with one or more dedicated hardware logic circuits. Alternatively, the control section and the method thereof described in the present disclosure may be implemented by one or more dedicated computers configured by a combination of a processor and a memory programmed to execute one or more functions and a processor configured by one or more hardware logic circuits. The computer program may be stored in a non-transitory tangible computer-readable recording medium as an instruction to be executed by a computer.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause the vehicle travel control device to perform functions" should be understood that (i) only the circuit can cause the vehicle travel control device to perform all the functions, (ii) only the processor can cause the vehicle travel control device to perform all the functions, or (iii) the circuit can cause the vehicle travel control device to perform at least one of the functions and the processor can cause the vehicle travel control device to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle travel control device for controlling a vehicle travel in an independent turn wheel vehicle in which three or more wheels can be turned independently, or a swivel three-wheeled vehicle that has two front wheels and one rear wheel and whose rear wheel can be turned freely, the vehicle travel control device comprising:

a turn instruction unit that instructs a turn with a normal driving operation;

a pivot turn instruction unit that instructs a pivot turn for setting one of three or more wheels as a turning center and driving other wheels when turning the vehicle, using a target instruction value;

a turn wheel angle control unit that turns each of three or more wheels individually according to the turning center of the pivot turn instructed by the pivot turn instruction unit; and a brake and drive force control unit that brakes and drives each of three or more wheels individually, wherein:

the turn wheel angle control unit and the brake and drive force control unit acquires vehicle characteristics from a vehicle characteristic storage device; and the turn wheel angle control unit and the brake and drive force control unit calculate a turn wheel angle and a drive direction of each of three or more wheels based on the target instruction value to execute the pivot turn of the vehicle.

2. The vehicle travel control device according to claim 1, wherein:

the pivot turn instruction unit determines the turning center of the pivot turn based on a turning direction.

3. The vehicle travel control device according to claim 1, wherein:

the vehicle is equipped with a periphery monitor device that detects an obstacle around the vehicle, and a periphery information presentation device that presents information about a periphery of the vehicle to a passenger; and the turn wheel angle control unit and the brake and drive force control unit causes the periphery information presentation device to present the information when estimating a possibility of a contact with the obstacle detected by the periphery monitor device before starting the pivot turn or in a middle of executing the pivot turn.

4. The vehicle travel control device according to claim 3, wherein:

the vehicle is equipped with a park area detection device that detects a parking area; and the pivot turn instruction unit calculates the target instruction value for the pivot turn based on the parking area detected by the park area detection device.

5. The vehicle travel control device according to claim 1, wherein:

the vehicle is equipped with a vehicle direction detection device that detects and stores a yaw angle of the vehicle; and the pivot turn instruction unit calculates the target instruction value for the pivot turn to set a difference between an initial yaw angle of the vehicle before the pivot turn and a target yaw angle after the pivot turn to be the yaw angle of the pivot turn.

6. A vehicle travel control device for controlling a vehicle travel in an independent turn wheel vehicle in which three or more wheels can be turned independently, or a swivel three-wheeled vehicle that has two front wheels and one rear wheel and whose rear wheel can be turned freely, the vehicle travel control device comprising:

at least one of (i) a circuit and (ii) a processor having a memory storing computer program code, wherein:

the at least one of the circuit and the processor having the memory is configured to cause the vehicle travel control device to provide;

a turn instruction unit that instructs a turn with a normal driving operation;

a pivot turn instruction unit that instructs a pivot turn for setting one of three or more wheels as a turning center and driving other wheels when turning the vehicle, using a target instruction value;

a turn wheel angle control unit that turns each of three or more wheels individually according to the turning center of the pivot turn instructed by the pivot turn instruction unit; and a brake and drive force control unit that brakes and drives each of three or more wheels individually;

the turn wheel angle control unit and the brake and drive force control unit acquires vehicle characteristics from a vehicle characteristic storage device; and the turn wheel angle control unit and the brake and drive force control unit calculate a turn wheel angle and a drive direction of each of three or more wheels based on the target instruction value to execute the pivot turn of the vehicle.

\* \* \* \* \*